(12) United States Patent
Abdel-Kader et al.

(10) Patent No.: US 7,912,465 B2
(45) Date of Patent: Mar. 22, 2011

(54) SCANNING FOR WIRELESS LOCAL AREA NETWORKS

(75) Inventors: Sherif Abdel-Kader, Waterloo (CA); David Bajar, Kitchener (CA); Yongsheng Chen, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 1469 days.

(21) Appl. No.: 11/087,610

(22) Filed: Mar. 24, 2005

(65) Prior Publication Data

US 2006/0215622 A1 Sep. 28, 2006

(51) Int. Cl.
*H04W 4/00* (2009.01)
(52) U.S. Cl. ............ 455/434; 455/343.2; 370/311; 709/227; 709/228
(58) Field of Classification Search .......... 455/515, 455/432.1, 421, 422.1, 423, 67.11; 370/338, 370/245, 310.2, 320; 709/225
See application file for complete search history.

(56) References Cited

U.S. PATENT DOCUMENTS

| | | | |
|---|---|---|---|
| 6,842,460 B1 | 1/2005 | Olkkonen et al. | |
| 2002/0025810 A1 | 2/2002 | Takayama et al. | |
| 2002/0176366 A1 | 11/2002 | Ayyagari et al. | |
| 2003/0158922 A1 | 8/2003 | Park | |
| 2004/0039817 A1* | 2/2004 | Lee et al. | 709/225 |
| 2004/0043767 A1* | 3/2004 | Tsutsumi et al. | 455/432.1 |
| 2004/0063458 A1 | 4/2004 | Hori et al. | |
| 2004/0127240 A1 | 7/2004 | Li | |
| 2004/0137905 A1 | 7/2004 | Jeong et al. | |
| 2005/0037754 A1 | 2/2005 | Liu et al. | |
| 2005/0063334 A1* | 3/2005 | Fnu et al. | 370/329 |
| 2005/0068928 A1* | 3/2005 | Smith et al. | 370/338 |
| 2005/0128988 A1* | 6/2005 | Simpson et al. | 370/338 |
| 2005/0128989 A1* | 6/2005 | Bhagwat et al. | 370/338 |
| 2006/0142034 A1* | 6/2006 | Wentink et al. | 455/515 |
| 2006/0206592 A1* | 9/2006 | Fujii et al. | 709/220 |

FOREIGN PATENT DOCUMENTS

EP 1398912 3/2004

OTHER PUBLICATIONS

"Wireless LAN Medium Access Control (MAC) & Physical Layer (PHY) Specifications", IEEE -SA Standards Board, Wireless LAN Medium Access Control (MAC) & Physical Layer (PHY).
Muller, N , Exam Report for EP 05102408.1, Mar. 17, 2006.
Muller, N , "EESR", Extended European Search Report for EP 05102409.9, Dec. 2, 2005.
Muller, N , "EESR", Extended European Search Report for EP 05102408.1, Dec. 2, 2005.
Qiong, Chen , First Office Action with translation for CN 200610067683.8, Oct. 12, 2007.
Qiong, Chen , Second Office Action with translation for CN 200610067683.8, Mar. 28, 2008.

(Continued)

*Primary Examiner* — Huy Phan
*Assistant Examiner* — David Wang
(74) *Attorney, Agent, or Firm* — Integral Intellectual Property Inc.; Miriam Paton

(57) ABSTRACT

In a wireless device, active scanning for a particular wireless network name is initiated during passive scanning for a wireless network that matches a profile stored in a wireless local area network controller, the profile including the particular wireless network name. Active scanning for the particular wireless network name includes transmitting one or more probe requests, each transmitted on a different communication channel.

7 Claims, 3 Drawing Sheets

OTHER PUBLICATIONS

Qiong, Chen , First Office Action with translation for CN 200610067842, Oct. 12, 2007.
Wang, David , First Office Action for U.S. Appl. No. 11/087,609, Sep. 4, 2007.
Wang, David , Final Office Action for U.S. Appl. No. 11/087,609, Feb. 8, 2008.
Wang, David , Advisory Action for U.S. Appl. No. 11/087,609, Apr. 23, 2008.

* cited by examiner

SCANNING FOR WIRELESS LOCAL AREA NETWORKS

BACKGROUND OF THE INVENTION

The invention generally relates to wireless local area networks (WLAN). In particular, embodiments of the invention relate to power saving for one or more client devices in a wireless network.

Some wireless networks are based on a cellular architecture where the system is subdivided into wireless network cells. One type of wireless network cell, known as a basic service set (BSS), contains client devices controlled by a wireless network access point (AP), and another type of wireless network cell, known as an independent basic service set (IBSS), contains client devices which are not controlled by an access point.

In a BSS, client devices may communicate with the access point over a common wireless communication channel using a time sharing scheme. In an IBSS, client devices may communicate directly with other client devices over a common wireless communication channel using a time sharing scheme. A service set identifier (SSID) is a label or name that distinguishes one wireless network from another. Client devices use the SSID to establish and maintain connectivity. Wireless access points of different BSSs may be connected via a distribution system (DS) that is usually a wired network. The entire interconnected WLAN network, including the different WLAN cells, their respective WLAN access points and the distribution system is known as an extended service set (ESS). A client device may be able to switch between BSS mode and IBSS mode.

A client device may, or may not, be battery-powered. For example, a client device, such as a wireless-enabled laptop, a wireless-enabled cellphone, a wireless-enabled personal digital assistant (PDA), and the like, may sometimes be battery-powered, and at other times may receive power from an external source, such as a power outlet. Other client devices, such as a desktop computer, may receive power from an external source, such as a power outlet, and may not have the option to be battery-powered.

It may be beneficial to enhance the battery lifetime of battery-powered client devices.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

Figure 1:
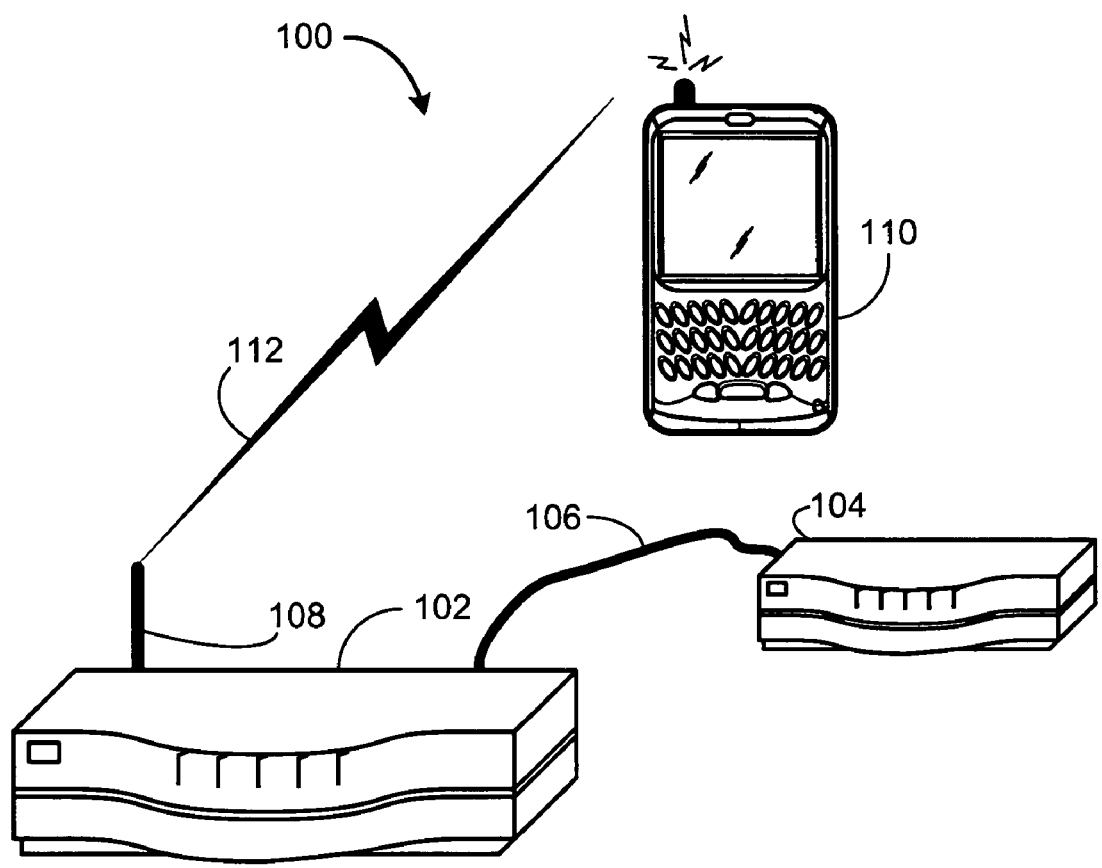
FIG. 1 is an illustration of an exemplary communications system, according to some embodiments of the invention.

FIG. 1 is an illustration of an exemplary communications system 100 according to embodiments of the invention. System 100 includes a wireless access point (AP) 102 and a network gateway 104 coupled to AP 102 via wired connections 106. Network gateway 104 and wired connections 106 may be part of a "distribution system" for AP 102. Non-limiting examples for network gateway 104 are cable modems, Asymmetric Digital Subscriber Line (ADSL) modems, Asynchronous Transfer Mode (ATM) network gateways, dial-up modems, satellite modems, Integrated Services Digital Network (ISDN) gateways, T-carrier 1 (T1) modems, and the like. It is obvious that any other configuration of a distribution system for AP 102 is possible.

AP 102 has at least one antenna 108 and is configurable to support at least one wireless network name, for example, at least one service set identifier (SSID). A non-exhaustive list of examples for antenna 108 includes a dipole antenna, a monopole antenna, a multilayer ceramic antenna, a planar inverted-F antenna, a loop antenna, a shot antenna, a dual antenna, an omnidirectional antenna and any other suitable antenna. AP 102 may include a router.

Exemplary communications system 100 includes a wireless client device 110. A non-exhaustive list of examples for client device 110 includes a wireless-enabled laptop, a wireless-enabled cellphone, a wireless-enabled personal digital assistant (PDA), a wireless-enabled video camera, a wireless-enabled gaming console, a wireless Internet-Protocol (IP) phone and any other suitable wireless client device. Client device 110 is able to execute a process to associate itself with AP 102 in a wireless network. For example, client device 110 may become associated with AP 102 over a wireless network 112.

Figure 2:
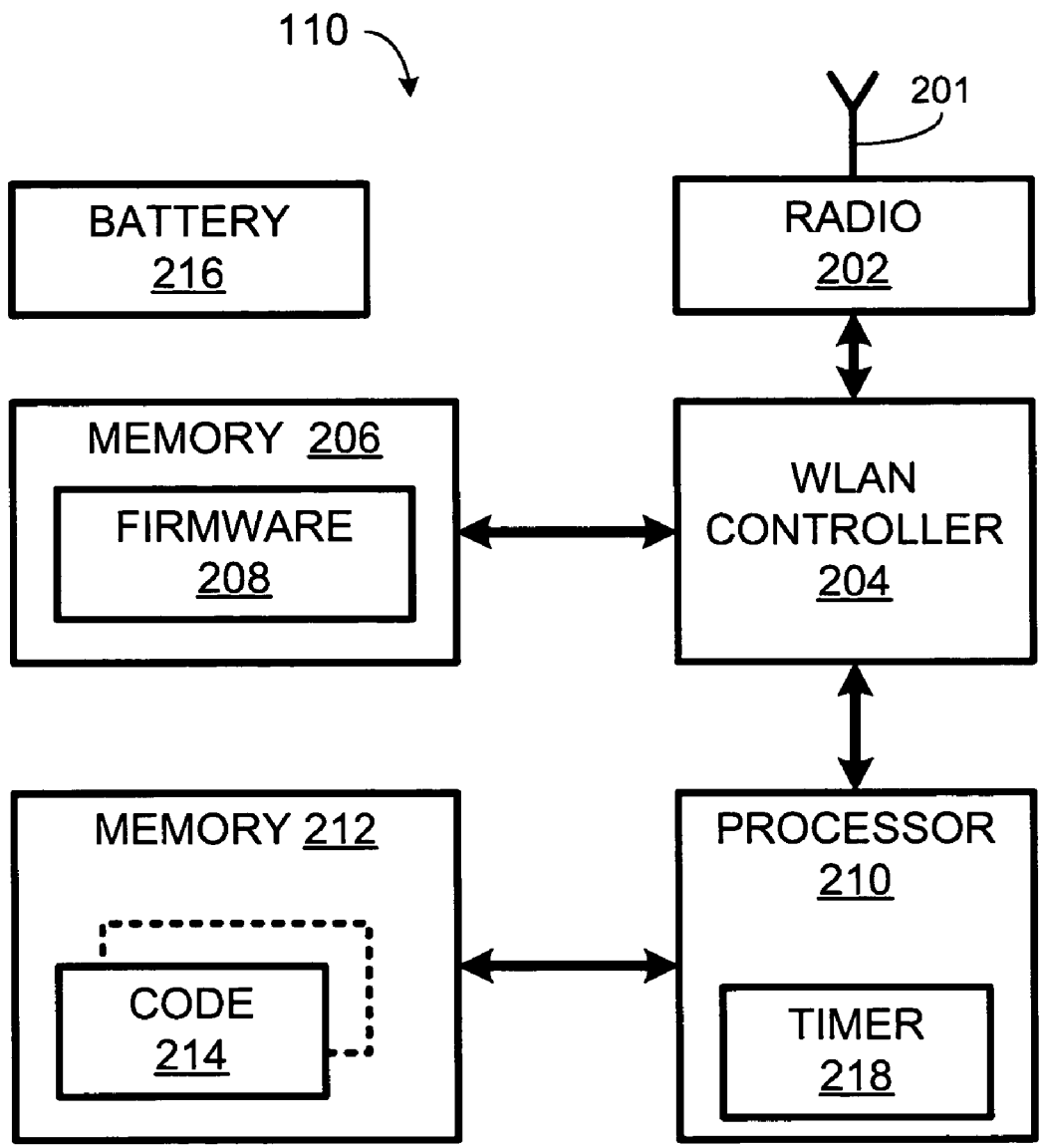
FIG. 2 is a block diagram of an exemplary client device, according to some embodiments of the invention.

FIG. 2 is a block diagram of an exemplary client device 110, according to some embodiments of the invention. Wireless client device 110 includes at least one antenna 201 coupled to a radio 202, which in turn is coupled to a WLAN controller 204. WLAN controller 204 may be coupled to a memory 206 storing firmware 208 to be executed by WLAN controller 204. Wireless client device 110 includes a processor 210 and a memory 212 coupled to processor 210. Memory 212 may store executable code 214 to be executed by processor 210.

Processor 210 may be coupled to WLAN controller 204 and may be able to control, at least in part, the operation of WLAN controller 204. Client device 110 includes a battery 216 to provide power to radio 202, WLAN controller 204, processor 210 and memories 206 and 212. Wireless client device 110 may include other components that, for clarity, are not shown.

A non-exhaustive list of examples for processor 210 includes a central processing unit (CPU), a digital signal processor (DSP), a reduced instruction set computer (RISC), a complex instruction set computer (CISC) and the like. Memories 206 and 212 may be fixed in or removable from client device 110. A non-exhaustive list of examples for memories 206 and 212 includes any combination of the following:

a) semiconductor devices such as registers, latches, read only memory (ROM), mask ROM, electrically erasable programmable read only memory devices (EEPROM), flash memory devices, non-volatile random access memory devices (NVRAM), synchronous dynamic random access memory (SDRAM) devices, RAMBUS dynamic random access memory (RDRAM) devices, double data rate (DDR) memory devices, static random access memory (SRAM), universal serial bus (USB) removable memory, and the like;

b) optical devices, such as compact disk read only memory (CD ROM), and the like; and c) magnetic devices, such as a hard disk, a floppy disk, a magnetic tape, and the like.

A non-exhaustive list of examples for antenna 201 includes a dipole antenna, a monopole antenna, a multilayer ceramic antenna, a planar inverted-F antenna, a loop antenna, a shot antenna, a dual antenna, an omnidirectional antenna and any other suitable antenna.

Radio 202, WLAN controller 204, processor 210 and memories 206 and 212 are functional blocks and may be implemented in any physical way in client device 110. For example, radio 202, WLAN controller 204, processor 210 and memories 206 and 212 may each be implemented in a separate integrated circuit, and optionally in additional discrete components. Alternatively, some of the functional blocks may be grouped in one integrated circuit. Furthermore, the functional blocks may be parts of application specific integrated circuits (ASIC), field programmable gate arrays (FPGA) or application specific standard products (ASSP).

In the example of FIG. 1, AP 102 and client device 110 are both "802.11-enabled", which means that wireless communications therebetween are in accordance with one or more of the following standards defined by the Institute of Electrical and Electronic Engineers (IEEE) for Wireless LAN MAC and Physical layer (PHY) specifications. However, it will be obvious to those of ordinary skill in the art how to modify the following for other existing WLAN standards or future related standards, including 802.11n.

| Standard | Published | Maximum Speed | Frequency | Modulation |
| --- | --- | --- | --- | --- |
| 802.11 | 1997 | 2 Mbps | 2.4 GHz | Phase-Shift |
| 802.11a | 1999 | 54 Mbps | 5.0 GHz | Orthogonal Frequency Division Multiplexing |
| 802.11b | 1999 | 11 Mbps | 2.4 GHz | Complementary Code Keying |
| 802.11g | 2003 | 54 Mbps | 2.4 GHz | Orthogonal Frequency Division Multiplexing |

The 1999 edition of the 802.11 standard (as reaffirmed Jun. 12, 2003) distinguishes between infrastructure WLANs (BSS) and ad-hoc WLANs (IBSS).

In order to join a BSS managed by AP 102, i.e. to become connected to AP 102 over wireless network 112, client device 110 has to initiate and perform a "connectivity sequence" with AP 102. In client device 110, WLAN controller 204 may perform the connectivity sequence, optionally jointly with processor 210. The connectivity sequence may include three consecutive processes—a "probing" process, an "authentication" process and an "association" process.

The probing process begins by having the client device transmit one or more "probe request" frames over one or more communication channels defined by the communication standard. Standard 802.11B, for example, defines 11 different communication channels. The probe request frame contains information about client device 110, such as which data rates are supported by client device 110 and to which SSID client device 110 requests to connect. Client device 110 may send probe requests blindly, without being aware whether an access point with the same SSID exists in its vicinity, and without knowing what data rate is acceptable for that access point. For that reason, client device 110 may send probe requests at the lowest data rate defined by the respective standard, e.g. 1 Mbps (Megabits per second).

If AP 102 receives a probe request frame on one of the communication channels, it may reply to the probe request frame by transmitting a "probe response" frame on that channel. A probe response frame includes information such as the SSID for which AP 102 is configured, a timestamp, data rates supported by AP 102, "beacon interval" information and physical layer information.

If client device 110 receives a probe response frame transmitted by AP 102, it may examine whether the SSID of AP 102 matches the SSID sent by client device 110 in the probe request, may examine other information included in the probe response frame and may examine the strength of the signal carrying the frame. Client device 110 may decide whether to continue the process for connecting with AP 102.

After completing the probing process, client device 110 may have to identify itself and to get permission to connect with AP 102. This process can have different forms, depending on a security mechanism deployed in the particular network. In one simple example for this process, client device 110 may send an "authentication request" frame to AP 102 and in response may receive an "authentication response" frame from AP 102. If the authentication response frame grants client device 110 permission to connect with AP 102, client device 110 may initiate the association process.

Client device 110 may initiate an association process by transmitting an "association" frame. In response, AP 102 may transmit an "association response" frame that indicates the success or failure of the association. If the association succeeded, the association response frame may include an association identification (AID) for client device 110.

The total time to complete a full connectivity sequence, from the first probe request to reception of the association response, may vary and may be as long as several seconds, for example, 3 seconds. The probing process itself may take, for example, 1 second. The timing in which the different response frames arrive at client device 110 during the connectivity sequence is unknown, and therefore, during the entire connectivity sequence, radio 202 may have to be able to receive signals and cannot be in a "sleep" state to conserve power.

It may be desired to decrease the amount of power consumed by client device 110 while performing a connectivity sequence in order to conserve the power stored in battery 216.

The 802.11 standard explains that access points transmit beacon frames at substantially regular time periods to announce the existence of and to synchronize wireless networks. The format of beacon frames and their contents is explained in detail in the 802.11 standard. The beacon interval is included in each beacon frame. The number of time units between target beacon transmission times is referred to as a "beacon interval".

Beacon frames may, or may not include the SSID of the wireless network they belong to. For example, beacon frames transmitted by AP 102 over wireless network 112 may contain the SSID associated with wireless network 112. In addition, each beacon frame also includes a timestamp which is the value of a clock internal to the access point at the actual transmission time of the beacon. A client device receiving the beacon frame will update its internal clock according to the timestamp in the received beacon frame. Moreover, beacon frames may include other information.

Client device 110 may look for a wireless network, for example, wireless network 112, using techniques known as "active scanning" and "passive scanning". In preparation, processor 210 may program a profile of the wireless network that is sought, including the network's SSID, to WLAN controller 204. Upon being operatively coupled to radio 202, WLAN controller 204 may automatically initiate passive scanning for the sought network. In passive scanning, WLAN controller 204 listens for beacon frames, one communication channel at a time. If a beacon frame including the SSID of the sought wireless network is received, WLAN controller 204 may initiate an authentication process and, if the authentication process is successful, may initiate an association process with the access point that sent the beacon frame. If a beacon frame not including any SSID is received, WLAN controller 204 may initiate a connectivity sequence by sending a probe request on the communication channel of the received beacon frame. If the profile in the probe response matches the profile stored in WLAN controller 204, WLAN controller 204 may initiate an authentication process and, if the authentication process is successful, may initiate an association process with the access point that sent the probe response. If the profile in the probe response matches the SSID of the profile stored in WLAN controller 204, but does not match other characteristics of that profile, or if the profile in the probe response does not match the SSID of the profile stored in WLAN controller 204, then WLAN controller 204 may proceed to passively scan on the next communication channel. Client device 110 may wait a predefined period of time, for example, 3 seconds, for WLAN controller 204 to report having successfully associated with the sought wireless network. If no such report is received during this predefined period of time (timed using a timer 218 in processor 210), client device 110 may take additional action, such as, for example, programming into WLAN controller 204 the profile of an additional wireless network to search for, or putting radio 202 into a sleep state.

If client device 110 were to use only passive scanning when looking for a wireless network and the sought network was unavailable, then client device 110 would be required to wait the full predefined period of time before taking additional action.

Figure 3:
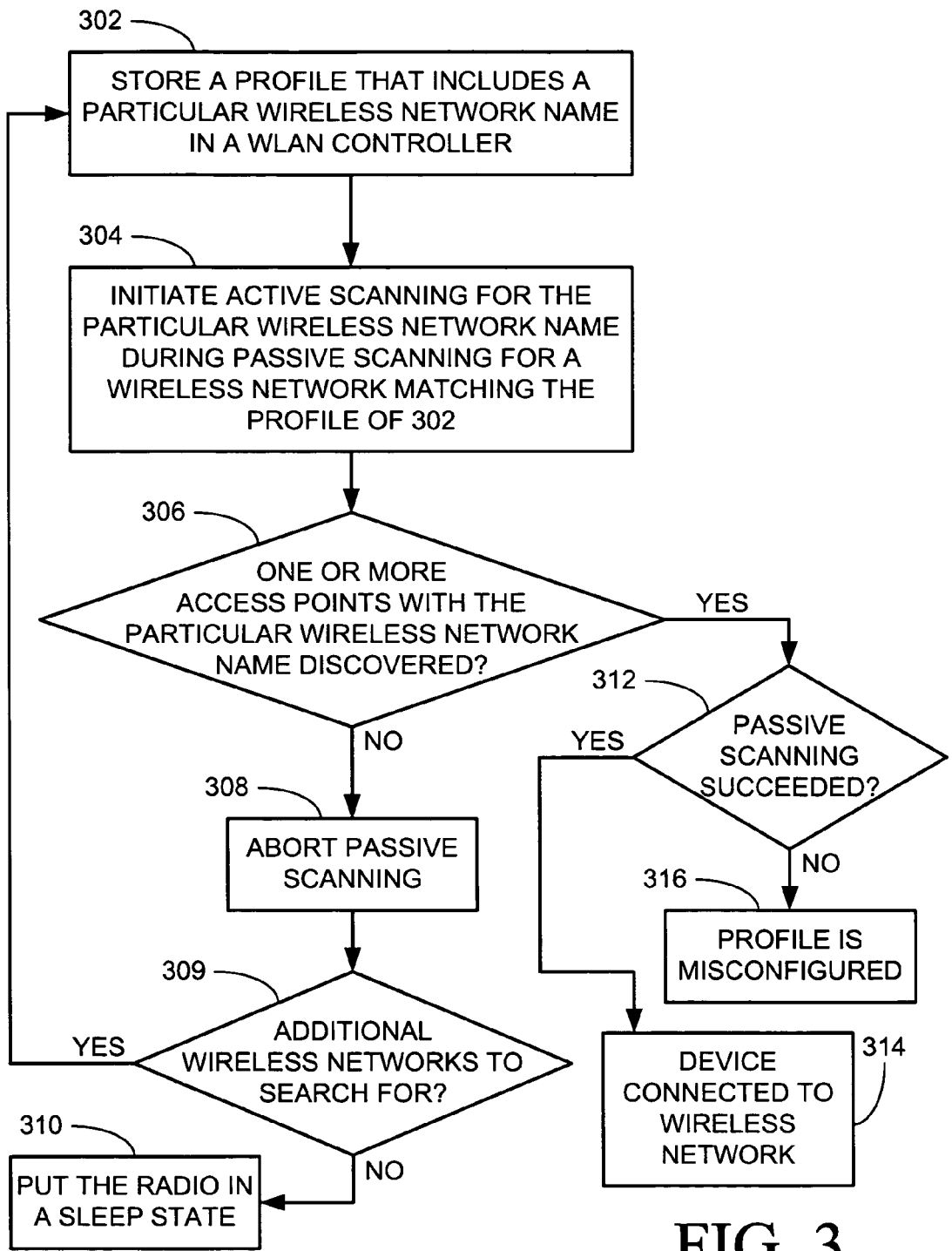
FIG. 3 is a flowchart of an exemplary method to be performed by a client device, according to some embodiments of the invention.

FIG. 3 is a flowchart of an exemplary method to be implemented by client device 110, according to some embodiments of the invention. Executable code 214, when executed by processor 110, may cause client device 110 to implement the method of FIG. 3.

At 302, client device 110 may store a profile that includes a particular wireless network name in WLAN controller 204.

At 304, client device 110 may initiate active scanning for the particular wireless network name during passive scanning for a wireless network that matches the profile stored in WLAN controller 204 at 302. Active scanning for the particular wireless network name may include transmitting one or more probe requests, each of the probe requests transmitted on a different communication channel.

In active scanning, WLAN controller 204 does not wait for the receipt of a beacon frame in order to transmit the probe request. Moreover, WLAN controller 204 reports back to processor 210 as soon as WLAN controller 204 has succeeded in discovering an access point with the particular wireless network name in the probe requests of the active scanning. Similarly, WLAN controller 204 reports back to processor 210 as soon as WLAN controller 204 has failed to discover any access points with the particular wireless network name in the probe requests of the active scanning.

Consequently, if no access point with the particular wireless network name has been discovered due to the active scanning, client device 110 will be notified of such sooner than if it had relied only on passive scanning.

If processor 210 receives a response that indicates a failure to discover any access points with the particular wireless network name (checked at 306), processor 210 may abort the passive scanning at 308.

Memory 212 may store profiles of more than one wireless network to be sought. For example, a user of client device 110 may store in memory 212 profiles of the wireless networks at the user's home, the user's workplace and other wireless networks that the user may wish to connect to.

If there are no additional wireless networks to be sought (checked at 309), then client device 110 may put radio 202 into a sleep state at 310. After sleeping for some time, client device 110 may put radio 202 into an active state and resume the method of FIG. 3. The sleeping duration may be increased with each unsuccessful attempt to find the wireless network, until it reaches an upper limit.

If there are additional wireless networks to be sought (checked at 309), then client device may resume the method at 302 to store a different profile with a different wireless network name in WLAN controller 204. This may cause WLAN controller 204 to perform passive scanning for wireless networks that match the different profile.

If, however, processor 210 receives a response that indicates discovery of one or more access points with the particular wireless network name (checked at 306), then the passive scanning, if successful (checked at 312), ought to result in association of client device 110 and the wireless network at 314. If passive scanning is not successful (checked at 312) despite the discovery of one or more access points with the particular wireless network name via active scanning, this is an indication that the profile stored in WLAN controller 204 at 302 is misconfigured (316).

In the event of a misconfigured profile, client device 110 may post an error to the user indicating an invalid configuration in the profile, and/or may automatically omit that profile from further scans until the user has edited the parameters of the profile (perhaps changing the authentication setting or the encryption setting).

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method in a wireless device, the method comprising:
   initiating active scanning for a particular wireless network name during passive scanning for a wireless network that matches a profile stored in a wireless local area network controller so that said active scanning and said passive scanning are performed concurrently at some point in time, said profile including said particular wireless network name; and
   aborting said passive scanning upon receipt of a response from said active scanning that indicates a failure to discover any access points with said particular wireless network name.

2. The method of claim 1, further comprising:
   storing a different profile with a different wireless network name in said wireless local area network controller; and
   during passive scanning for a wireless network matching said different profile, initiating active scanning for said different wireless network name so that said active scanning for said different wireless network name and said passive scanning for a wireless local area network matching said different profile are performed concurrently at another point in time.

3. The method of claim 1, further comprising:

putting a radio of said device into a sleep state following receipt of said response from said active scanning.

4. A wireless device comprising:

a memory to store profiles of one or more wireless networks;

a wireless local area network controller that supports passive scanning for wireless networks matching a profile and that supports active scanning for wireless networks having a wireless network name; and a processor, wherein said memory is to store executable code which, when executed by said processor, initiates active scanning by said controller for a particular wireless network name during passive scanning by said controller for a wireless network that matches a profile including said particular wireless network name so that said active scanning and said passive scanning are performed concurrently at some point in time, and wherein said code, when executed by said processor, is, upon receipt of a response from said active scanning that indicates a failure to discover any access points with said particular wireless network name, to cause said controller to abort said passive scanning.

5. The wireless device of claim 4, wherein said code, when executed by said processor, initiates active scanning by said controller for a different wireless network name during passive scanning by said controller for a wireless network that matches a different profile including said different wireless network name so that said active scanning and said passive scanning are performed concurrently at another point in time.

6. The method of claim 1, wherein active scanning for said particular wireless network name includes transmitting one or more probe requests, each of said one or more probe requests transmitted on a different communication channel.

7. The wireless device of claim 4, wherein active scanning by said controller for said particular wireless network name includes transmitting one or more probe requests, each of said one or more probe requests transmitted on a different communication channel.

* * * * *